United States Patent Office 3,236,306
Patented Feb. 22, 1966

3,236,306
TREATMENT OF CLAY-CONTAINING FORMATIONS
Donald K. Atwood, Bellaire, Tex., assignor, by mesne assignments, to Esso Production Research Company, Houston, Tex., a corporation of Delaware
No Drawing. Filed Nov. 7, 1963, Ser. No. 322,058
15 Claims. (Cl. 166—42)

The present invention is directed to treatment of subsurface clay-containing formations. More particularly, the invention is concerned with treatment of subsurface clay-containing formations which have been contacted with fresh water. In its more specific aspects, the invention is concerned with the restoration of permeability to clay-containing formations which have been contacted with fresh water.

The present invention may be briefly described as a method for treating a subsurface clay-containing formation such as one from which hydrocarbons such as oil and gas may be produced (but not limited thereto) which has been contacted with fresh water. In short, the invention is also applicable to water injection wells, and the like. In the practice of the present invention, the formation which has been contacted with fresh water and the permeability thereof lowered by said contact is preferably treated first with a liquid hydrocarbon and then with an aliphatic alcohol in which water is soluble in an amount within the range from about 2.0% to about 12% by weight and which has an interfacial tension with water of at least about 4 but which may range upwardly to about 10 dynes per cm. The partition coefficient, which is the ratio of the solubility of water in the alcohol to the solubility of the alcohol in water, must be at least about 3 and may range upwardly to the maximum for the solubility in water which is about 1200. Thereafter, the formation is then treated again with a liquid hydrocarbon whereby the original permeability of the formation is substantially restored.

The alcohols finding use in the present invention are preferably the normal saturated aliphatic alcohols. However, the invention is not limited to the normal saturated alcohols, but other alcohols may be employed provided the alcohols have an interfacial tension with water within the range of about 4 to 10 dynes per cm. and the solubility of water in the alcohol is from about 2.0% to about 12% by weight. In the present invention, water is soluble in the alcohol in an amount up to about 12% by weight and has an interfacial tension with water in dynes per cm. at least about 4.0.

The alcohols which satisfy these requirements may be exemplified by 1-pentanol, 2-pentanol, 3-pentanol, mixtures of isomeric pentanols, 1-hexanol, 1-heptanol, 1-octanol and mixtures of isomeric isooctanols, 2-ethylbutanol, 2-ethylhexanol, mixtures of isomeric decanols and 2-methylpentanol. Of these alcohols, the pentanols, 2-hexanol and 1-heptanol are preferred. For example, 1-hexanol has an interfacial tension with water of 6.8 dynes per cm. and water is soluble in the alcohol to an extent of 7.2% by weight. In short, in the practice of the present invention the alcohol is only partially miscible or soluble in water. The following table gives the characteristics of the alcohols which may be used in the present invention:

Table I

| Alcohol | Solubility, in Water | Percent by wt. Water in— | Partition Coefficient | Interfacial Tension, dynes/cm. |
|---|---|---|---|---|
| n-Butanol | 7.7 | 20.1 | 2.6 | 1.8 |
| Isobutanol | 8.7 | 15.0 | 1.7 | 2.1 |
| 1-Pentanol | 2.7 | 10.2 | 3.8 | 4.4 |
| 3-Pentanol | 2.0 | 8.3 | 4.1 | 4.8 |
| Mixed Isomers | 1.7 | 9.2 | 5.4 | 4.4 |
| 1-Hexanol | 0.6 | 7.2 | 12.4 | 6.8 |
| 1-Heptanol | 1.8 | 5.4 | 3.0 | 7.7 |
| Octanol-mixed Isomers | 0.1 | 3.5 | 35.0 | 7.7 |
| 2-Ethylbutanol | 0.4 | 4.6 | 12.5 | 7.5 |
| 2-Ethylhexanol | 0.1 | 2.6 | 26.0 | 9.0 |
| 2-Methylpentanol | 0.3 | 5.4 | 18.0 | 6.0 |
| Mixed isomers—Decanol | <.01 | 2.4 | 240.0 | 8.5 |

Thus, it will be clear that the several alcohols shown, excluding the butanols, may be employed in the present invention. The solubilities of the alcohols in water and of water in the alcohols may be determined by starting with the pure liquids, adding one to the other in small increments until saturation is reached and two phases remain. By starting with water and adding the alcohol, the solubility of the alcohol in water is determined. The inverse procedure gives the solubility of water in the alcohol. The interfacial tension may be measured by any standard means such as the drop-weight method or with a du Nouy tensiometer. This measurement is made at the interface between the two liquid phases, each saturated with the other.

The amount of alcohol to be employed in the practice of the present invention may range from about 42 to about 84 gallons of alcohol per foot of formation to be treated. Stating this otherwise, a volume of alcohol equivalent to about 1 to about 2 times the pore volume of the portion of formation to be treated may be sufficient.

The hydrocarbon employed in the practice of the present invention is a liquid hydrocarbon such as one having a viscosity from about 0.5 to about 5.0 centipoises at 70° F. Exemplary of the liquid hydrocarbons may be mentioned the gasoline hydrocarbons boiling from about 80° F. up to about 400° F. and fractions thereof, kerosene, gas-oil and fractions of kerosene and gas-oil. Purified hydrocarbons may also be employed such as, but not restricted to pentane, hexane, heptane, octane, the other members of the homologous series, as well as the corresponding naphthenic and aromatic hydrocarbons. In the practice of the present invention, hydrocarbons having viscosities in the range given boiling from about 80° F. up to about 750° F. may be used. The lower boiling hydrocarbons may also be employed provided a pressure is employed sufficient to maintain the normally gaseous hydrocarbons in the liquid phase.

The amount of hydrocarbons employed may range from about 100 to about 150 gallons per foot of formation which is contacted with the hydrocarbon. Stating the quantity of the hydrocarbon differently, the total volume of hydrocarbon may be equivalent to about 1 to about 3 times the pore volume. The hydrocarbon application will be preferably applied before and after the treatment with the alcohol although either or both of the hydrocarbon treatments may be dispensed with under certain circumstances. This treatment may be applied, as stated, before and after the treatment with the alcohol and may be divided equally; an amount within the range of about 40% to about 60% may be applied before alcohol treatment and then an amount within the range of about 40% to about 60% may be applied after alcohol treatment.

In treating a formation in accordance with the present invention, an amount of hydrocarbon within the range stated will be introduced into a well bore drilled to pierce the formation which is to be treated and which has been damaged by contact with fresh water, followed by the stated amount of alcohol which is then followed by the treatment with an additional amount of hydrocarbon. A sufficient pressure below the fracture gradient of the formation may be applied to force the hydrocarbon, alcohol, and hydrocarbon into the formation. Thereafter, the pressure may be reduced and hydrocarbons produced from the formation since the permeability of the formation is restored by the practice of the present invention.

In this connection, it has been found that sharp reductions in permeability often occur when relatively fresh water contacts clay-containing formations during drilling and workover operations. The common clay minerals which are known to cause permeability damage to formations are montmorillonites, kaloins, chlorites and illites. These clays are constructed of particles which adsorb water on their surface and edges. This adsorption increases as water salinity decreases, and at low salinity, particles disperse into the aqueous phase. Permeability losses are caused by removal of inorganic ions from the environment surrounding the clay with consequent swelling and/or dispersion of clay minerals into the pore space. This phenomenon is generally termed clay damage, fresh water damage, or simply formation damage, and it causes large loss in current revenue by preventing oil wells from making their allowable production. Heretofore, no satisfactory method existed for restoring permeability to clay-containing formations damaged by water. With the practice of the present invention, losses of permeability suffered by contacting the formation with fresh water are substantially restored or, in some instances, the permeability is increased. In accordance with the present invention, by treatment of the water-damaged formation with an alcohol of the type set out herein, permeability is substantially restored to the formation.

In order to illustrate the present invention further, a number of runs were made on core plugs cut from well cores containing clay. These core plugs were deliberately damaged with fresh water and then attempts were made to restore the permeability or repair the damage. To this end, a 1-inch core plug is cut from conventional well cores containing clay. These core plugs are extracted with tetrachloroethylene to remove hydrocarbons, and with methanol to remove water. After extraction, the cores are saturated with 12% sodium chloride solution and confined in the rubber sleeve of a permeability apparatus at a pressure of 300 p.s.i.g. Fluids are then flowed through the cores in accordance with the following flood sequence:

(1) 12% sodium chloride solution.
(2) Kerosene having a viscosity of 2.6 centipoises.
(3) Fresh water.
(4) Kerosene having a viscosity of 2.6 centipoises.
(5) Treating agent.
(6) Kerosene having a viscosity of 2.6 centipoises.

In a first run using the sequence set out above, oil permeability of cores is measured before and after damage by fresh water. Comparison of the permeabilities shows that each core is badly damaged by fresh water. Acetone is then flooded through the cores until most of the water is extracted from the pore space. The cores are then flooded with kerosene and permeabilities are measured for comparison with the damaged permeability.

In one of the cores, the permeability is increased only slightly, while in the other, it is actually decreased to a value well below the fresh water damaged permeability. Vacuum distillation of the cores upon completion of the last oil flood shows that the water saturation is reduced by the acetone flood to less than 10% of the pore volume or pore cores.

In another operation, runs identical to those performed with acetone are made using isopropyl alcohol as the treating agent. Again, in this instance the increase in permeability is small compared to the loss in permeability when the core is damaged by contact with fresh water. Vacuum distillation after final oil floods reveals that water saturation is well below 10% of the pore volume.

Other operations are conducted with ethanol in runs identical to those described for acetone and isopropyl alcohol. Permeabilities measured during the early stages of the final oil flood are essentially the same as the damaged permeability even though subsequent vacuum distillation indicates that the water saturation has been drastically reduced. As the oil flood continues, the permeability gradually increased but the final value is still well below the original permeability.

In accordance with the present invention, operations were performed where normal 1-hexanol was employed as the treating agent. The results of these runs are set out in the following Table II.

*Table II*

EFFECT OF n-HEXANOL ON DAMAGED CORES

| General Flood Sequence No. | Core 1 | Core 2 | Core 3 | Core 4 | Core 5 | Core 6 |
|---|---|---|---|---|---|---|
| 1. $k_w$ to 12% NaCl soln | 1.7 | 84 | 0.230 | 7.92 | 155 | 200 |
| 2. $k_o$ to Kerosene | 0.95 | 71 | 0.243 | 6.17 | 199 | 197 |
| 3. $k_w$ to distilled H$_2$O | 3×10⁻³ | <1 | 2×10⁻³ | | 2.35 | 0.60 |
| 4. $k_o$ to Kerosene | 0.50 | 4 | 0.202 | 2.96 | 155 | 57 |
| 5. Inject n-Hexanol | | | | | | |
| 6. $k_o$ to Kerosene after n-Hexanol | 1.6 | 55 | 0.381 | 8.90 | 250 | 253 |
| Percent montmorillonite | 8–10 | 6–8 | 6–8 | 7–9 | 7–10 | <1 |

$k_w$ is permeability to water in millidarcies.
$k_o$ is permeability to oil in millidarcies.

From the foregoing data, it will be clear that the treatment with normal hexanol restored the permeability to kerosene of each core and actually increased the permeability of some cores. In short, the present invention allows the obtaining of unobvious results over the treatment with water-miscible solvents such as acetone, isopropyl alcohol and ethanol.

Runs are made employing 1-pentanol, 1-heptanol, and 1-hexanol, using the sequence of treatment outlined heretofore. In each of these instances, the permeability of the water-damaged, clay-containing formation is substantially restored.

Similar treatments are performed with other alcohols such as isomeric octanols, 2-ethylhexanol and isomeric decanols. The improved permeabilities are also obtained.

The present invention is quite advantageous and useful in that restoration of permeability to water-damaged formations allows increased production of hydrocarbons to be obtained from the damaged formations. Thus, the present invention is quite advantageous and useful.

The nature and objects of the present invention having been completely described and illustrated and the best mode thereof contemplated set forth, what we wish to claim as new and useful and secure by Letters Patent is:

1. A method for treating a subsurface clay-containing formation which has been damaged by contact with fresh water such that the permeability of said formation has been lowered which comprises treating said damaged formation with an aliphatic alcohol in which water is soluble in an amount from about 2% to about 12% by weight and which has an interfacial tension with water in dynes per cm. at least about 4.0 and a partition coefficient at least about 3 whereby the original permeability of said formation is substantially restored.

2. A method in accordance with claim 1 in which the alcohol is pentanol.

3. A method in accordance with claim 1 in which the alcohol is 1-hexanol.

4. A method in accordance with claim 1 in which the alcohol is 1-heptanol.

5. A method in accordance with claim 1 in which the interfacial tension with water is within the range from about 4 to about 10 dynes per cm.

6. A method for treating a subsurface clay-containing formation pierced by a well, said formation having been damaged by contact with fresh water such that the permeability of said formation has been lowered, which comprises injecting into said well an aliphatic alcohol in which water is soluble in an amount from about 2% to about 12% by weight and which has an interfacial tension with water in dynes per cm. at least about 4.0 and a partition coefficient of at least 3 and treating an exposed face of said formation with said alcohol whereby the original permeability of said formation is substantially restored.

7. A method in accordance with claim 6 in which the alcohol is pentanol.

8. A method in accordance with claim 6 in which the alcohol is 1-hexanol.

9. A method in accordance with claim 6 in which the alcohol is 1-heptanol.

10. A method for treating a subsurface clay-containing formation pierced by a well, said formation having been damaged with fresh water such that the permeability of said formation has been lowered, which comprises treating the damaged formation with an aliphatic alcohol in which water is soluble in an amount from about 2% to about 12% by weight and which has an interfacial tension with water in dynes per cm. at least about 4.0, and a partition coefficient of at least 3, and then contacting the treated formation with a liquid hydrocarbon whereby the original permeability of siad formation is substantially restored.

11. A method in accordance with claim 10 in which the hydrocarbon is kerosene.

12. A method in accordance with claim 11 in which the alcohol is hexanol.

13. A method for treating a subsurface clay-containing formation pierced by a well, said formation having been damaged with fresh water such that the permeability of said formation has been lowered, which comprises first contacting said damaged formation with a liquid hydrocarbon, treating said first contacted formation with an aliphatic alcohol in which water is soluble in an amount from about 2% to about 12% by weight and has an interfacial tension with water in dynes per cm. at least about 4.0 and a partition coefficient of at least 3, and then contacting the treated formation with a liquid hydrocarbon whereby the original permeability of said formation is substantially restored.

14. A method in accordance with claim 13 in which the hydrocarbon is kerosene.

15. A method in accordance with claim 14 in which the alcohol is 1-hexanol.

References Cited by the Examiner
UNITED STATES PATENTS

| | | | |
|---|---|---|---|
| 2,324,254 | 7/1943 | Bertness et al. | 166—44 |
| 2,345,713 | 4/1944 | Moore et al. | 166—42 |
| 3,036,630 | 5/1962 | Bernard et al. | 166—42 X |

CHARLES E. O'CONNELL, *Primary Examiner.*

UNITED STATES PATENT OFFICE
CERTIFICATE OF CORRECTION

Patent No. 3,236,306　　　　　　　　　　　　　　February 22, 1966

Donald K. Atwood

It is hereby certified that error appears in the above numbered patent requiring correction and that the said Letters Patent should read as corrected below.

Column 1, line 59, for "2-hexanol" read -- 1-hexanol --.

Signed and sealed this 23rd day of May 1967.

(SEAL)
Attest:

EDWARD M. FLETCHER, JR.　　　　　　　　　　　EDWARD J. BRENNER
Attesting Officer　　　　　　　　　　　　　　　Commissioner of Patents